(12) United States Patent
Beard

(10) Patent No.: US 9,276,246 B2
(45) Date of Patent: Mar. 1, 2016

(54) TREATMENT AND ADHESIVE FOR MICROPOROUS MEMBRANES

(75) Inventor: Kirby W. Beard, Norristown, PA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 734 days.

(21) Appl. No.: 12/784,284

(22) Filed: May 20, 2010

(65) Prior Publication Data

US 2010/0297489 A1 Nov. 25, 2010

Related U.S. Application Data

(60) Provisional application No. 61/180,128, filed on May 20, 2009.

(51) Int. Cl.
| | |
|---|---|
| *H01M 6/00* | (2006.01) |
| *H01M 2/16* | (2006.01) |
| *B32B 5/18* | (2006.01) |
| *B32B 7/14* | (2006.01) |

(Continued)

(52) U.S. Cl.
CPC ............ *H01M 2/1673* (2013.01); *B32B 5/18* (2013.01); *B32B 7/14* (2013.01); *C09J 127/16* (2013.01); *H01G 9/02* (2013.01); *H01G 9/155* (2013.01); *H01M 2/1653* (2013.01); *H01M 10/04* (2013.01); *B32B 2457/16* (2013.01); *H01M 2/168* (2013.01); *H01M 10/052* (2013.01); *H01M 10/058* (2013.01); *H01M 10/0525* (2013.01); *H01M 10/0565* (2013.01); *H01M 10/06* (2013.01); *Y02E 60/13* (2013.01)

(58) Field of Classification Search
CPC ........ B32B 5/18; B32B 7/14; B32B 2457/16; C09J 127/16; H01G 9/02; H01G 9/155; H01M 2/1653; H01M 2/1673; H01M 10/04; H01M 2/168; H01M 10/052; H01M 10/0525; H01M 10/0565; H01M 10/058; H01M 10/06; Y02E 60/13
USPC .......................................................... 28/623.4
See application file for complete search history.

(56) References Cited

U.S. PATENT DOCUMENTS

| | | |
|---|---|---|
| 3,284,274 A | 11/1966 | Hulslander et al. |
| 3,551,364 A | 12/1970 | McGarr |

(Continued)

FOREIGN PATENT DOCUMENTS

| | | |
|---|---|---|
| EP | 223709 | 8/1991 |
| EP | 959513 | 11/1999 |

(Continued)

OTHER PUBLICATIONS

Joel Escobedo et al., "Surface Tension Prediction for Liquid Mixtures", AIChE Journal, vol. 44, No. 10, p. 2324, 1998.

(Continued)

*Primary Examiner* — Gary Harris
(74) *Attorney, Agent, or Firm* — Cantor Colburn LLP

(57) ABSTRACT

An electrochemical cell may have a PVDF microporous membrane that may be adhesively bonded to electrodes. The adhesive may be a mixture of a solvent and non-solvent that may cause the PVDF membrane to become tacky and adhere to an electrode without collapsing. An adhesively bonded cell may be constructed using multiple layers of adhesively bonded membranes and electrodes. In some embodiments, the adhesive solution may be used as a sizing to prepare electrodes for bonding.

20 Claims, 3 Drawing Sheets

(51) Int. Cl.

| | | |
|---|---|---|
| *C09J 127/16* | (2006.01) | |
| *H01G 9/02* | (2006.01) | |
| *H01G 9/00* | (2006.01) | |
| *H01M 10/04* | (2006.01) | |
| H01M 10/052 | (2010.01) | |
| H01M 10/0525 | (2010.01) | |
| H01M 10/0565 | (2010.01) | |
| H01M 10/058 | (2010.01) | |
| H01M 10/06 | (2006.01) | |

(56) References Cited

U.S. PATENT DOCUMENTS

| | | | |
|---|---|---|---|
| 3,642,668 A | 2/1972 | Bailey et al. | |
| 3,770,504 A | 11/1973 | Bergum | |
| 3,929,504 A * | 12/1975 | Gore et al. | 429/338 |
| 4,194,041 A | 3/1980 | Gore et al. | |
| 4,203,847 A | 5/1980 | Grandine, II | |
| 4,203,848 A | 5/1980 | Grandine, II | |
| 4,216,281 A | 8/1980 | O'Rell et al. | |
| 4,296,184 A | 10/1981 | Stachurski | |
| 4,367,271 A | 1/1983 | Hasegawa et al. | |
| 4,384,047 A | 5/1983 | Benzinger et al. | |
| 4,399,035 A | 8/1983 | Nohmi et al. | |
| 4,464,238 A | 8/1984 | Caldwell et al. | |
| 4,629,563 A | 12/1986 | Wrasidlo | |
| 4,666,607 A | 5/1987 | Josefiak et al. | |
| 4,681,819 A | 7/1987 | Gnyra | |
| 4,810,384 A | 3/1989 | Fabre | |
| 4,867,881 A | 9/1989 | Kinzer | |
| 4,933,081 A | 6/1990 | Sasaki et al. | |
| 4,965,291 A | 10/1990 | Kitoh et al. | |
| 5,011,698 A | 4/1991 | Antoon, Jr. et al. | |
| 5,013,339 A | 5/1991 | Mahoney et al. | |
| 5,024,594 A | 6/1991 | Athayde et al. | |
| 5,027,572 A | 7/1991 | Purcell et al. | |
| 5,086,104 A | 2/1992 | Wada et al. | |
| 5,149,655 A | 9/1992 | McCabe et al. | |
| 5,266,391 A | 11/1993 | Donato et al. | |
| 5,318,866 A | 6/1994 | Degen et al. | |
| 5,378,558 A | 1/1995 | Hope | |
| 5,387,378 A | 2/1995 | Pintauro et al. | |
| 5,489,406 A | 2/1996 | Beck et al. | |
| 5,521,023 A | 5/1996 | Kejha et al. | |
| 5,705,084 A | 1/1998 | Kejha | |
| 5,772,930 A | 6/1998 | Hashimoto et al. | |
| 5,778,515 A * | 7/1998 | Menon | 29/623.4 |
| 5,834,107 A | 11/1998 | Wang et al. | |
| 5,922,493 A | 7/1999 | Humphrey, Jr. et al. | |
| 5,989,750 A | 11/1999 | Ohba | |
| 6,013,688 A | 1/2000 | Pacheco et al. | |
| 6,080,511 A | 6/2000 | Kejha | |
| 6,110,309 A | 8/2000 | Wang et al. | |
| 6,122,772 A | 9/2000 | De Guzman | |
| 6,146,747 A | 11/2000 | Wang et al. | |
| 6,200,706 B1 | 3/2001 | Ashida et al. | |
| 6,203,941 B1 | 3/2001 | Reichert et al. | |
| 6,251,540 B1 | 6/2001 | Kejha | |
| 6,277,439 B1 | 8/2001 | Painter | |
| 6,326,105 B1 | 12/2001 | Kejha et al. | |
| 6,337,101 B1 | 1/2002 | Gozdz | |
| 6,387,565 B1 | 5/2002 | Aihara et al. | |
| 6,396,682 B1 | 5/2002 | Kim et al. | |
| 6,432,586 B1 | 8/2002 | Zhang | |
| 6,444,356 B1 | 9/2002 | Ma et al. | |
| 6,468,697 B1 | 10/2002 | Ferment et al. | |
| 6,537,334 B1 | 3/2003 | DuPasquier et al. | |
| 6,537,703 B2 | 3/2003 | DuPasquier et al. | |
| 6,579,342 B2 | 6/2003 | Wang et al. | |
| 6,579,643 B1 | 6/2003 | Gozdz | |
| 6,586,138 B2 | 7/2003 | Pekala et al. | |
| 6,632,561 B1 | 10/2003 | Bauer et al. | |
| 6,815,380 B2 | 11/2004 | Snyder | |
| 6,881,337 B2 | 4/2005 | Meluch et al. | |
| 6,884,375 B2 | 4/2005 | Wang et al. | |
| 6,949,285 B1 | 9/2005 | Tobinaga et al. | |
| 6,949,317 B2 | 9/2005 | Yoshida et al. | |
| 6,994,811 B2 | 2/2006 | Kools | |
| 6,998,193 B2 | 2/2006 | Sun | |
| 7,008,722 B2 | 3/2006 | Huang | |
| 7,112,389 B1 | 9/2006 | Arora et al. | |
| 7,166,544 B2 | 1/2007 | Padhi et al. | |
| 7,258,914 B2 | 8/2007 | Morikawa et al. | |
| 7,338,692 B2 | 3/2008 | Smith et al. | |
| 7,351,338 B2 | 4/2008 | Tada et al. | |
| 7,455,772 B2 | 11/2008 | Tada et al. | |
| 7,981,467 B2 | 7/2011 | Doyen et al. | |
| 8,697,273 B2 * | 4/2014 | Less | H01M 2/1673 429/144 |
| 2003/0059683 A1 * | 3/2003 | Blau et al. | 429/314 |
| 2003/0072999 A1 * | 4/2003 | Birke et al. | 429/217 |
| 2003/0172458 A1 | 9/2003 | Bonfanti et al. | |
| 2004/0043224 A1 | 3/2004 | Sternberg | |
| 2004/0241550 A1 | 12/2004 | Wensley et al. | |
| 2005/0266054 A1 | 12/2005 | Tsai | |
| 2006/0081530 A1 | 4/2006 | Beard | |
| 2006/0151318 A1 | 7/2006 | Park et al. | |
| 2006/0254207 A1 | 11/2006 | Mulligan | |
| 2007/0039268 A1 | 2/2007 | Ambrose, Jr. et al. | |
| 2007/0061900 A1 | 3/2007 | Murphy et al. | |
| 2007/0100012 A1 * | 5/2007 | Beard | 521/99 |
| 2007/0198070 A1 | 8/2007 | Oliveira | |
| 2007/0243649 A1 | 10/2007 | Beard | |
| 2007/0292750 A1 | 12/2007 | Beard | |
| 2008/0070107 A1 | 3/2008 | Kasamatsu et al. | |
| 2009/0064618 A1 | 3/2009 | Ben-Daat | |
| 2009/0118562 A1 | 5/2009 | Cole et al. | |
| 2009/0222995 A1 | 9/2009 | Perry et al. | |
| 2009/0223155 A1 | 9/2009 | Perry et al. | |
| 2009/0227163 A1 | 9/2009 | Perry et al. | |
| 2009/0241453 A1 | 10/2009 | Dellinger et al. | |

FOREIGN PATENT DOCUMENTS

| | | |
|---|---|---|
| EP | 1401037 | 3/2004 |
| JP | 09-180709 A2 | 7/1997 |
| JP | 2001-266943 | 9/2001 |
| KR | 10-2009-0003823 | 1/2009 |
| WO | WO 90/11092 | 10/1990 |
| WO | WO 99/63609 A1 | 12/1999 |
| WO | WO 00/51424 | 9/2000 |
| WO | WO 2004/102694 A2 | 11/2004 |
| WO | WO 2005/123599 | 12/2005 |
| WO | WO 2007/147167 A1 | 12/2007 |
| WO | WO 2007/147167 A3 | 12/2007 |
| WO | WO 2008/127334 A1 | 10/2008 |

OTHER PUBLICATIONS

Z.W. Li et al., "Generation of Mice With a 200-kb Amyloid Precursor Protein Gene Deletion by Cre Recombinase-Mediated Site-Specific Recombination in Embryonic Stem Cells", Proc. Natl. Acad. Sci. USA, Jun. 11, 1996, 93(12):6158-62. Erratum in Proc. Natl. Acad. Sci. USA, Oct. 15, 1996, 93(21):12052.

* cited by examiner

TREATMENT AND ADHESIVE FOR MICROPOROUS MEMBRANES

BACKGROUND

Microporous membranes are used in various electrochemical and energy storage devices such as super capacitors and batteries to separate electrodes. Batteries or super capacitors may be constructed by layering the microporous separator between an anode and cathode, then infiltrating the device with an electrolyte. For convenience, throughout this document the term "electrochemical cell" shall refer to any type of energy storage cell unless otherwise noted.

In many cases, microporous membranes may be manufactured using PVDF or other polymers. Because of the microporous nature, the membranes may be very fragile. Holes or tears in the membrane may lead to shorts between the electrodes, rendering a battery cell or an entire electrochemical device unusable. Blockages within the membranes may decrease performance by not allowing ions in the electrolyte to pass from one electrode to another.

Some batteries are constructed as multiple layers of electrodes and separators. The batteries may be wound into a cylinder, wound about a flat plate, or constructed as flat sandwiches of multiple layers.

SUMMARY

An electrochemical cell may have a PVDF microporous membrane that may be adhesively bonded to electrodes. The adhesive may be a mixture of a solvent and non-solvent that may cause the PVDF membrane to become tacky and adhere to an electrode without collapsing. An adhesively bonded cell may be constructed using multiple layers of adhesively bonded membranes and electrodes. In some embodiments, the adhesive solution may be used as a sizing to prepare electrodes for bonding.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

An electrochemical cell may be constructed from a PVDF microporous separator bonded to electrodes using an adhesive comprising a solvent capable of dissolving the PVDF, but with enough non-solvent to prevent the destruction of the microporous separator. The adhesive may cause the PVDF separator to become tacky when wet and to adhere to an electrode after curing.

An electrochemical cell, such as a battery, capacitor, or supercapacitor, may have anode and cathode electrodes separated by a separator film. In general, the more closely the electrodes are spaced, the higher the performance of the cell. However, when the electrodes touch each other, they may short. A short may render the cell inoperable, as well as cause a fire or other destruction when a short occurs while the cell is energized.

PVDF (Polyvinylidene Fluoride) is a polymer that may be formed into microporous membranes using different methods. In one method, PVDF may be dissolved in a solvent and mixed with a second liquid which may be a non-solvent and have a higher surface tension and higher boiling point than the solvent. Such a solution may be processed by raising the temperature until the solvent begins to evaporate, causing the polymer to gel, after which the temperature may be raised until the second liquid may be removed. In a second manufacturing method, the PVDF may be dissolved into a solvent and then cast while submersed in a water bath. The polymer may gel during the casting process.

When creating an electrochemical cell, the layers of electrodes and separators may be bonded together to keep the layers from separating or for the cell to expand. In some embodiments, a casing or container may apply some compressive force between the layers, either by mechanical compression or by applying a vacuum to the inside of the cell.

The adhesive, especially when containing polymer, may be suitable for repairing pinholes in a microporous membrane composed of the same polymer. The adhesive may be applied by a dropper or other applicator and may allow the membrane to be repaired while leaving a protective layer of polymer.

The adhesive may also be used as a sizing to fill voids or correct surface imperfections. When the sizing may be applied to the microporous membrane, the sizing may fill pinholes. When the sizing may be applied to an electrode, the surface of the electrode may be prepared for bonding.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

Figure 1:
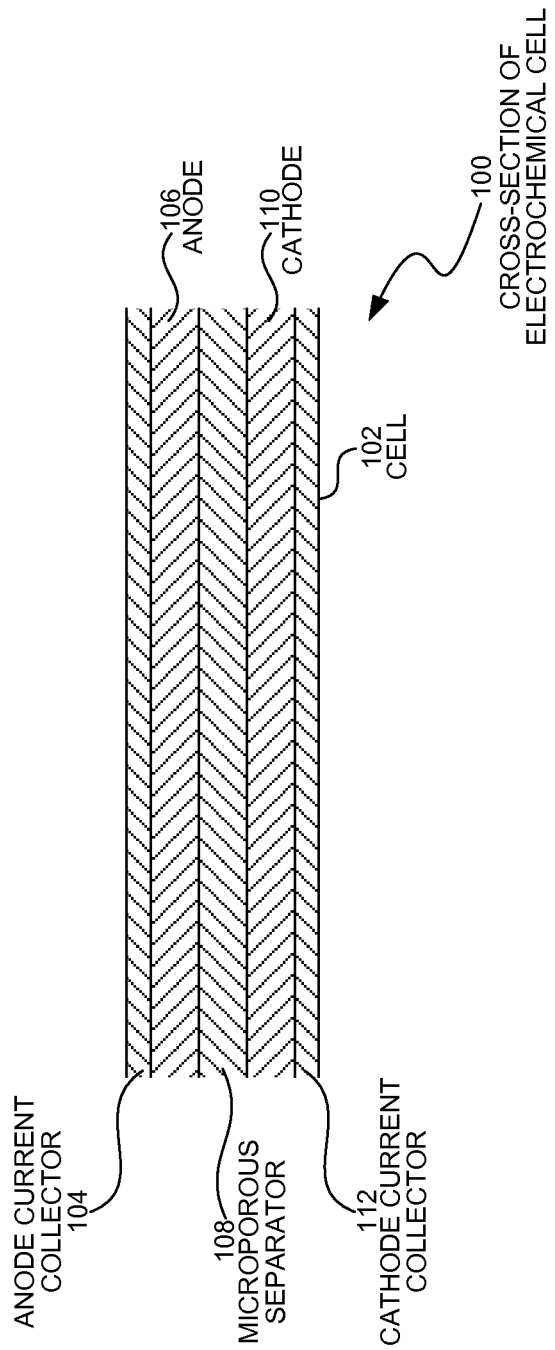
FIG. 1 is a diagram illustration of an embodiment showing a cross-sectional view of an electrochemical cell.

FIG. 1 is a diagram of an embodiment 100, showing an electrochemical cell 102 in cross-section.

The cell 102 may be a typical construction of a battery or supercapacitor. The cell 102 may be a lithium ion battery, lithium polymer battery, lead acid battery, or other type of electrochemical cell.

An anode current collector 104 may be a conductive film that may conduct a positive charge from the anode 106. In a typical construction, the anode 106 may be active material, such as carbon in a conventional lithium-ion battery chemistry.

A microporous separator 108 may separate the anode 106 from a cathode 110. The cathode 110 may be a second active material, such as a metal oxide in a conventional lithium-ion battery chemistry.

The separator 108 may be constructed of PVDF using various methods to produce a microporous film. The film may have small holes that may be interconnected to allow an electrolyte to permeate the separator 108. Within the electrolyte, ions may pass between the anode and cathode during charging and discharging events. The electrolyte may contain a lithium salt in an organic solvent.

The separator 108 may have a thickness on the order of 25 to 50 microns and have porosities of 60 to 85%. Within the separator 108, small webs of 2 to 4 microns thick may form the structure of the microporous material.

Because the separator 108 may have very small structural walls, the selection of an adhesive may be sensitive to the performance of the separator. If the separator dissolves substantially, the polymer within the separator may collapse and restrict ion conduction between the electrodes.

An adhesive may contain both a solvent and non-solvent. The solvent may be a strong or weak solvent that may be further diluted with the non-solvent. The solvent may partially dissolve the PVDF material to the point of becoming tacky but not to the point of collapsing. The tackiness may be sufficient to effectively bond the PVDF separator to an electrode.

Examples of suitable solvents may include methyl formate, acetone (2-propanone), methyl acetate, tetrahydrofuran, ethyl acetate, methyl ethyl ketone (2-butanone), acetonitrile, dimethyl carbonate, 1,2-dioxane, toluene, acetone, and methyl isobutyl ketone.

Acetone, in particular, may be effective as a room temperature adhesive. Acetone is a very effective solvent of PVDF at higher temperatures, such as 55 degrees C., but is only a poor solvent at room temperature.

The adhesive or a variant of the adhesive may be used as a sizing on the electrodes prior to adhesive bonding. The sizing may improve bonding between the electrode and separator when the adhesive is applied. The sizing may be applied to the electrode and allowed to dry or cure. After curing, the adhesive bonding process may be performed.

In some embodiments, the adhesive may contain up to 6% by weight of the same polymer as the separator.

Figure 2:
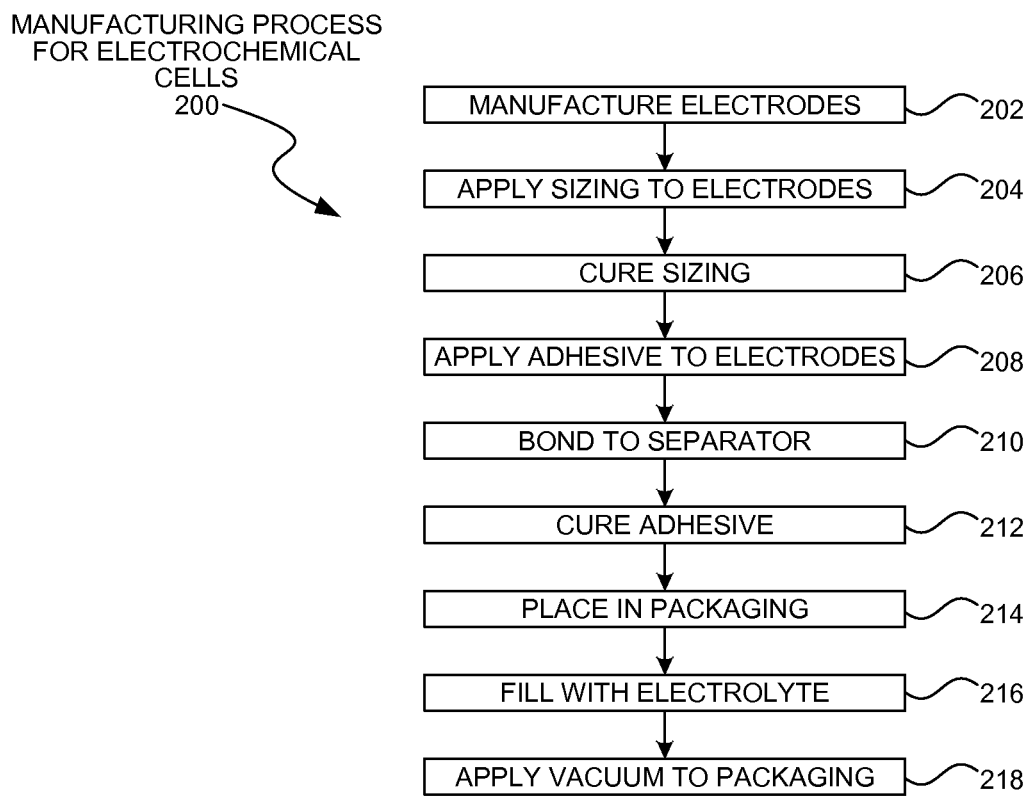
FIG. 2 is a flowchart illustration of an embodiment showing a method for constructing an electrochemical cell.

FIG. 2 is a flowchart illustration of an embodiment 200 showing a method for manufacturing an electrochemical cell.

Other embodiments may use different sequencing, additional or fewer steps, and different nomenclature or terminology to accomplish similar functions. In some embodiments, various operations or sets of operations may be performed in parallel with other operations, either in a synchronous or asynchronous manner. The steps selected here were chosen to illustrate some principles of operations in a simplified form.

Embodiment 200 illustrates a simplified method for assembling an electrochemical cell. Embodiment 200 illustrates a method for creating a single cell, but the same concepts and steps may be expanded to include electrochemical devices with multiple cells.

The electrodes may be manufactured in block 202. In many embodiments, an electrode may be manufactured on an aluminum, copper or other metallic film where the metallic film may be a current collector for the cell.

Sizing may be applied to the electrodes in block 204 and cured in block 206. The sizing may be the same or similar formulation as the adhesive used to bond the separator to the electrode.

The adhesive may be applied to the electrodes in block 208 and the electrodes may be bonded to the separator in block 210. The adhesive may be cured in block 212, placed in a packaging or container in block 214, and filled with electrolyte in block 216. The assembly may have a vacuum applied in block 218 to remove any air and allow the electrolyte to fully permeate the separator.

The bonding operation may be performed in many different manners. In some cases, the adhesive may be applied to the electrode and then the separator may be mated to the electrode. The adhesive may be applied by spraying, dipping, pouring, wiping, or any other method.

In some embodiments, the adhesive may be applied to coat the entire surface, or at least a majority of the surface of an electrode. In other embodiments, the adhesive may be selectively applied to the electrode.

For example, the adhesive may be applied in a series of dots or spots that cover 50% or less of the surface area of an electrode. In some cases, the adhesive may be applied to less than 25%, 20%, 15%, 10%, 5%, 2%, or 1% of the bonding area of the electrode.

In some embodiments, the adhesive may be applied to the separator. The adhesive may be sprayed or otherwise applied to the bonding surfaces of the separator. In some cases, the separator may be submerged or fully infiltrated with the adhesive. When the adhesive is applied to the separator, the adhesive may be applied selectively to the separator and may cover a percentage of the surface area of the separator.

The adhesive may be cured by applying heat, vacuum, or other processes. In some cases, the adhesive may be reactivated by applying additional adhesive after an electrode and separator stack is formed.

The packaging for an electrochemical cell may vary in different applications. In some embodiments, the packaging may be a flexible pouch to which a vacuum may be applied. Other embodiments may use metal cans of various shapes, including cylindrical, rectangular, or other shapes. In some embodiments, the packaging may apply mechanical pressure to the electrochemical cell to compact the layers of electrodes and separators.

Figure 3:
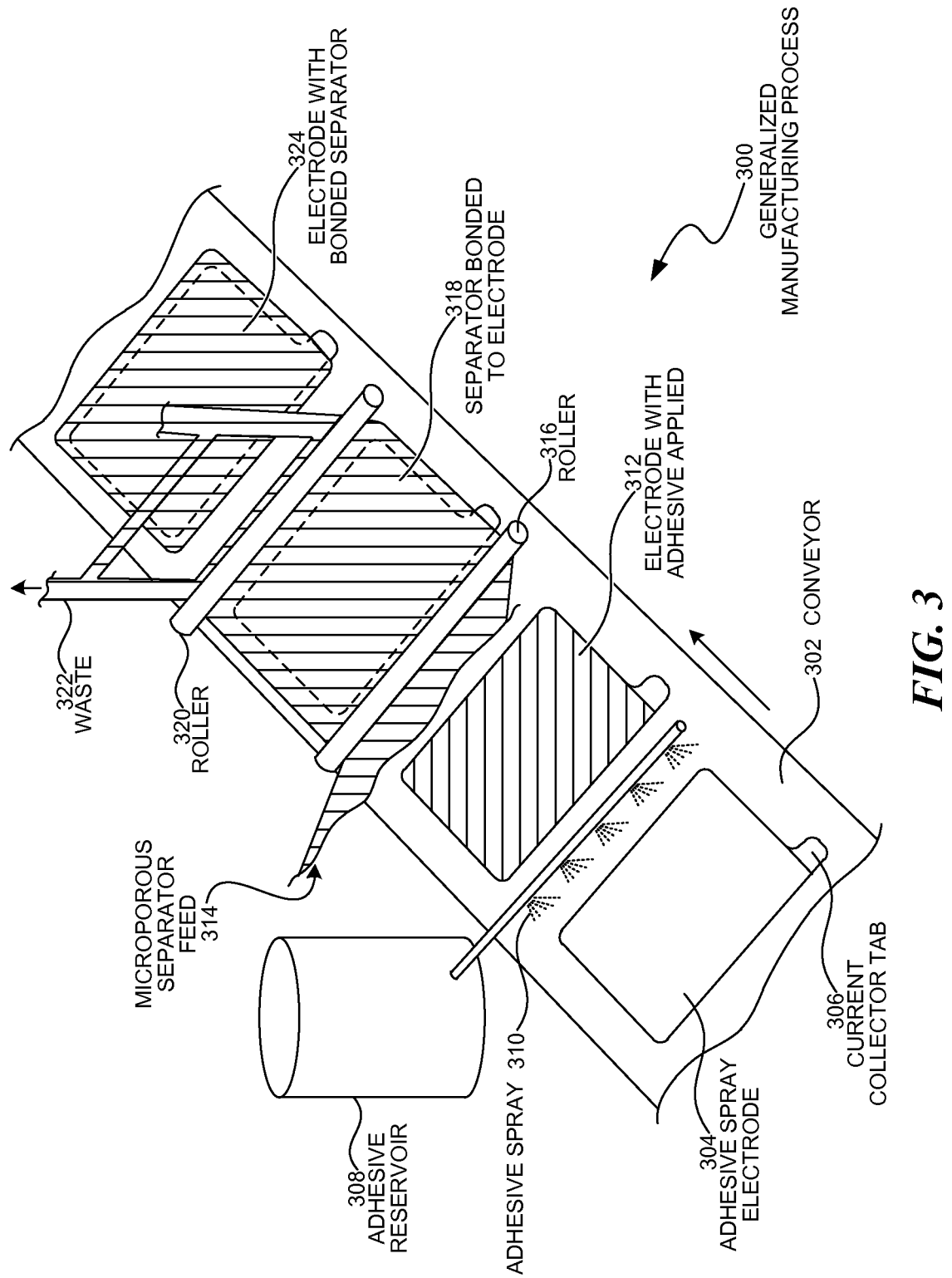
FIG. 3 is a flowchart illustration of an embodiment showing a method for assembling a subassembly for an electrochemical cell.

FIG. 3 is a diagram illustration of an embodiment 300 showing a simplified assembly process for an electrode and separator subassembly.

Embodiment 300 illustrates a conveyor 302 on which electrode subassemblies may be manufactured. Embodiment 300 is a schematic illustration of a simple production line where electrode subassemblies may be manufactured in a continuous fashion.

At a first stage of the assembly process, an electrode 304 may be placed on a conveyor 302. The electrode may be constructed with a current collector that may be exposed as a current collector tab 306. The remaining surface of the electrode 304 may contain the active electrode material corresponding with the anode or cathode of an electrochemical cell.

In many embodiments, the electrodes and separators may be sheet goods that may be layered to create an electrochemical cell. Each component of the cell may have a surface that may bond or contact another component. The sheet goods may be processed using sheet processing mechanisms, and the sheet goods may be roll goods or individual sheets of material.

In some embodiments, the sheet goods may be layered using many repeating stacks of layers to create multiple cells in a single device. The layers may be subsequently formed, such as winding into a cylinder, winding onto a flat mandrel, or otherwise folded or wound. In other embodiments, the layers may be stacked and assembled and used in a flat configuration.

An adhesive spray 308 may dispense adhesive from a reservoir 310 to form an electrode with adhesive applied 312. In some cases, the adhesive spray 308 may apply adhesive over the active portions of the electrode but may not apply adhesive on the current collector tab of the electrode.

The adhesive spray 308 illustrates a method whereby the full surface of the electrode may be coated with the adhesive. Other methods may include dipping, pouring, calendaring, and others.

In some embodiments, the adhesive may be applied in a method whereby the full surface of the electrode is not covered. For example, a pattern of application may be used so that 50% or less of the available bonding surface area of the electrode may have adhesive applied.

Various mechanisms may be used to apply adhesive in a selective fashion. Such methods may include screen printing, selective application using spraying, or other methods.

After the electrode has adhesive applied, a microporous separator feed mechanism 314 may supply a microporous separator in a sheet form. The separator may pass between rollers 316 and 318 to apply separator to the electrode to create a separator bonded to an electrode 320. The separator may be cut so that the waste 322 may be removed, yielding an electrode/separator subassembly 324.

In order to manufacture an electrochemical cell, several electrode subassemblies 324 may be stacked together, alternating between anodes and cathodes. The current collector tabs may be joined together, electrolyte added, and the electrochemical device may be packaged for use.

In several experiments, detailed below, different adhesive formulations were evaluated. In general, favorable results were obtained with a weak solvent combined with a non-solvent, where the non-solvent had a surface energy higher than the solvent. In some embodiments, the non-solvent may be formed from two liquids, one of which being a high surface energy liquid and the other being a lower surface energy liquid.

In some experiments, up to 6% by weight of polymer was added to the adhesive. Some embodiments may contain as little as 0% and may contain up to 1%, 2%, 4%, 8%, or 10% polymer by weight.

Tables A and B illustrate various solvents and non-solvents, respectively, for producing adhesives. Tables A and B include boiling point and surface energy parameters for the given liquids.

TABLE A

| Solvent Liquid | Normal Boiling Point, deg. C. | Surface Energy, dynes/cm |
|---|---|---|
| methyl formate | 31.7 | 24.4 |
| acetone (2-propanone) | 56 | 23.5 |
| methyl acetate | 56.9 | 24.7 |
| tetrahydrofuran | 66 | 26.4 |
| ethyl acetate | 77 | 23.4 |
| methyl ethyl ketone (2-butanone) | 80 | 24 |
| acetonitrile | 81 | 29 |
| dimethyl carbonate | 90 | 31.9 |
| 1,2-dioxane | 100 | 32 |
| Toluene | 110 | 28.4 |
| methyl isobutyl ketone | 116 | 23.4 |

TABLE B

| Non-Solvent Liquid | Normal Boiling Point, deg. C. | Surface Energy, dynes/cm |
|---|---|---|
| nitromethane | 101 | 37 |
| bromobenzene | 156 | 37 |
| formic acid | 100 | 38 |
| pyridine | 114 | 38 |
| ethylene bromide | 131 | 38 |
| 3-furaldehyde | 144 | 40 |
| bromine | 59 | 42 |
| tribromomethane | 150 | 42 |
| quinoline | 24 | 43 |
| nitric acid (69%) | 86 | 43 |
| water | 100 | 72.5 |

The following examples are test results from various configurations of bonding PVDF separators to electrodes.

EXAMPLE 1

A separator film was made of a blend of two PVDF homopolymers and a PVDF-HFP copolymer. The membrane was 80% porous as measured by ingress of isopropanol and by density.

A separator treatment solution was made using 3 parts (by weight) acetone and 1 part isopropanol. The separator membrane was wetted with this treatment solution and then placed between a commercial anode and cathode for construction of a single-cell lithium-ion battery. The assembly was assembled without clamping and solvents were allowed to evaporate from the assembly.

The cell was filled with 1 M, LiPF6, EC/EMC electrolyte, which easily wetted the components and displaced air from the system without use of vacuum, a particular attribute with this type of separator.

This cell had a discharge capacity of 11.9 mAh and a 12C rating of 1.6 mAh.

EXAMPLE 2

The procedure of Example 1 was repeated except that the separator film was treated at 40 degrees Celsius with a treatment solution consisting of: acetone 82.75%, isopropanol 12.5%, water 1.75%, and a blend of three PVDF polymers and copolymers mixture 3%.

A single cell battery was made with a separator with this treatment and two commercial electrodes. The cell was vacuum-dried at 40° C. and the components were well-bonded together without any damage to the porous separator. Its electrical performance was comparable to that of a clamped, unbonded cell using the same separator and electrodes and was far superior at high C rates to a commercial separator.

EXAMPLE 3

Three samples of a separator film of the lot of Example 1 was treated with 3 parts 3:1 acetone:isopropanol to 1 part by weight of a 90.5% acetone, 3.5% water, and 6% PVDF polymers and copolymer at 25 degrees Celsius.

Three single cell batteries were made with these separators and two commercial electrodes each. The cells were vacuum dried at 25 degrees Celsius. The components were well bonded together without any damage to the porous separator.

The electrical performance of each of the three cells was comparable to that of a clamped, unbonded cell using the same separator and electrodes.

EXAMPLE 4

A separator film of the lot of Example 1 was used for assembly of single cell batteries. In this example, the electrodes were treated with a "treatment solution" consisting of acetone, isopropanol, water, and the PVDF mixture. The separator was brought into contact with the electrodes at room temperature while the electrode surfaces were wet. The structure was then dried at 25 degrees Celsius by vacuum drying.

The electrical characteristics of this cell were excellent and were almost as good as a clamped cell prepared from the same components.

EXAMPLE 5

A separator film of the lot of Example 1 was used for assembly of single cell batteries. In this instance, the electrodes were coated lightly with a "treatment solution" consisting of: acetone, isopropanol, water, and PVDF mixture.

The treatment was allowed to dry and the electrodes were then assembled with 25 degrees Celsius by vacuum drying.

The cell performance characteristics were excellent.

In all of the examples, the cells were filled with 1 M, LiPF6, EC/EMC electrolyte, which easily wetted the components and displaced air from the system without use of vacuum—a particular attribute with this type of separator, in contrast to separators made of polyolefin plastics.

COMPARATIVE EXAMPLE A

Various solutions of acetone and a mixture of 70% isopropanol and 30% water were prepared for treatment of porous PVDF separators. When the separators were wetted and then placed in contact with one another the following results were obtained:

| Weight % acetone/70% isopropanol | Effect |
| --- | --- |
| 100/0 | complete dissolution of polymer |
| 98/2 | good tack bond |
| 96.2/3.8 | " |
| 94.3/5.7 | " |
| 92.6/7.4 | slight tack bond |
| 88.9/11.1 | no bond |

This test showed that a limited range of solvent/non-solvent is appropriate for solvent activation of the PVDF to accomplish an adhesive bond.

COMPARATIVE EXAMPLE B

Various solutions of acetone with 100% isopropanol were prepared for treatment of porous PVDF separators. When the separators were wetted and then placed in contact with one another, the following results were obtained:

| Weight percent acetone/isopropanol | Effects |
| --- | --- |
| 97.6/2.4 | complete dissolution of polymer |
| 93.5/6.5 | slight tack bond |
| 85.1/14.9 | very slight tack bond |
| 81.6/18.4 | no bond |

COMPARATIVE EXAMPLE C

Various solutions of acetone with water were prepared for treatment of porous PVDF separators. When the separators were wetted and then placed in contact with one another, the following results were obtained:

| Weight percent acetone/water | Effects |
| --- | --- |
| 97.6/2.4 | slight tack bond |
| 95.2/4.8 | good tack bond |
| 90.9/9.1 | no bond |

COMPARATIVE EXAMPLE D

Various solutions of dimethyl carbonate and methanol were prepared for treatment of porous PVDF separators. When the separators were wetted and then placed in contact with one another, the following results were obtained:

| Weight percent DMC/methanol | Effects |
| --- | --- |
| 97.6/2.4 | very good tack bond |
| 88.9/11/1 | good tack bond |
| 80.0/20.0 | " |

Dimethyl carbonate is one of the solvents commonly used for the electrolyte in lithium ion batteries. A small residue of dimethyl carbonate remaining within the battery may be tolerable, and the methanol of this mixture is known to evaporate quickly.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method of assembling an electrochemical cell comprising: receiving a first electrode for an electrochemical cell; receiving a microporous separator comprising polyvinylidene fluoride (PVDF), said microporous separator being at least 60% porous; using an adhesive to bond said microporous separator to said first electrode to form a first subassembly, said adhesive comprising: a solvent capable of dissolving said PVDF of said microporous separator; a non-solvent having a surface energy lower than a surface energy of said solvent; assembling said first subassembly to a second electrode to form said electrochemical cell.

2. The method of claim 1, said adhesive further comprising PVDF.

3. The method of claim 2, said solvent of said adhesive further comprising acetone.

4. The method of claim 1, said adhesive being applied to said electrode by spraying.

5. The method of claim 1, said adhesive being applied in a discontinuous manner to an interface area between said first electrode and said microporous separator.

6. The method of claim 5, said discontinuous manner comprising a dot pattern.

7. The method of claim 5, said discontinuous manner covering less than 50% of said interface area.

8. The method of claim 7, said discontinuous manner covering less than 2% of said interface area.

9. The method of claim 1 further comprising the following steps performed prior to said bonding:
applying said adhesive to said first electrode; and
allowing said adhesive to dry.

10. The method of claim 1, said first subassembly being assembled to said second electrode by using said adhesive.

11. The method of claim 10, said first subassembly being assembled to said second electrode prior to drying said adhesive used to form said first subassembly.

12. An electrochemical cell comprising: a first electrode; a microporous membrane manufactured from polyvinylidene fluoride (PVDF), said microporous membrane being at least 60% porous and adhesively bonded to said first electrode using an adhesive comprising: a solvent capable of dissolving said PVDF of said microporous membrane; a non-solvent having a surface energy lower than a surface energy of said solvent; a second electrode.

13. The electrochemical cell of claim 12, said second electrode being adhesively bonded to said microporous membrane using said adhesive.

14. A method of assembling an electrochemical cell comprising: receiving a first electrode for an electrochemical cell; receiving a microporous separator comprising polyvinylidene fluoride (PVDF), said microporous separator being at least 60% porous; preparing at least one surface of said first electrode for bonding to said microporous separator by filling voids or correcting surface imperfections prior to bonding; and using an adhesive to bond said microporous separator to said first electrode to form a first subassembly, said adhesive comprising: a solvent capable of dissolving said PVDF of said microporous separator; a non-solvent having a surface energy lower than a surface energy of said solvent; and assembling said first subassembly to a second electrode to form said electrochemical cell.

15. The method of claim 14 wherein the step of preparing the at least one surface of said first electrode for bonding to said microporous separator comprises applying a sizing to said first electrode.

16. The method of claim 15 further comprising an additional step wherein the sizing is allowed to dry or cure prior to the step of bonding said microporous separator to said first electrode.

17. The method of claim 15 wherein the sizing is the same formulation as the adhesive used to bond the separator to the electrode.

18. The method of claim 15 wherein the sizing is a different formulation than the adhesive used to bond the separator to the electrode.

19. The method of claim 16 wherein the sizing is a different formulation than the adhesive used to bond the separator to the electrode.

20. The method of claim 14 wherein the first electrode, the second electrode, or the first electrode and the second electrode do not comprise a polymer.

\* \* \* \* \*